US012405884B1

(12) United States Patent
Suryanarayana et al.

(10) Patent No.: US 12,405,884 B1
(45) Date of Patent: Sep. 2, 2025

(54) CONTEXT-AWARE FIRMWARE-MAPPED HOST MEMORY BUFFER (HMB) MANAGEMENT SYSTEM

(71) Applicant: Dell Products L.P., Round Rock, TX (US)

(72) Inventors: Shekar Babu Suryanarayana, Bangalore (IN); Thippeswamy D R, Tumkur (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/645,472

(22) Filed: Apr. 25, 2024

(51) Int. Cl.
*G06F 12/02* (2006.01)
*G06F 3/06* (2006.01)
*G06F 13/16* (2006.01)

(52) U.S. Cl.
CPC ........ *G06F 12/0246* (2013.01); *G06F 3/0608* (2013.01); *G06F 3/0658* (2013.01); *G06F 3/0679* (2013.01); *G06F 13/1673* (2013.01); *G06F 12/0292* (2013.01); *G06F 2213/0026* (2013.01)

(58) Field of Classification Search
None
See application file for complete search history.

(56) References Cited

U.S. PATENT DOCUMENTS

| 2022/0350529 A1* | 11/2022 | Kim | G06F 3/0679 |
| 2023/0195648 A1* | 6/2023 | Park | G06F 12/0868 |
| | | | 711/206 |
| 2024/0004561 A1* | 1/2024 | Benisty | G06F 3/0617 |
| 2024/0134696 A1* | 4/2024 | Moshe | G06F 9/5027 |

FOREIGN PATENT DOCUMENTS

| CN | 117668319 A | * | 3/2024 |
| CN | 117707639 A | * | 3/2024 |

OTHER PUBLICATIONS

NVM Express. NVM Express Base Specification. Jan. 2024. NVM Express. Rev. 2.0d. pp. 319-321, 387-388.*
Translation of CN-117668319-A. 2025.*
Translation of CN-117707639-A. 2025.*

* cited by examiner

*Primary Examiner* — Nathan Sadler
(74) *Attorney, Agent, or Firm* — Jackson Walker L.L.P.

(57) ABSTRACT

Disclosed systems and methods support dynamic HMB mapping at runtime to ensure seamless access across an array of NVMe drives. Disclosed systems and methods may feature a runtime workload context-aware memory reference protocol that provides a dynamic way to adjust the size of HMB as well internal memory regions based on the workload of an application, VM, or container. In at least some embodiments, disclosed systems and method detect an NVMe drive swap or removal event and dynamically retain, merge, adjust the HMB regions.

20 Claims, 3 Drawing Sheets

CONTEXT-AWARE FIRMWARE-MAPPED HOST MEMORY BUFFER (HMB) MANAGEMENT SYSTEM

TECHNICAL FIELD

The present disclosure pertains to systems management and, more particularly, management of a host memory buffer resource.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The NVM Express (NVMe) interface allows host software to communicate with a non-volatile memory subsystem. This interface is optimized for enterprise-class and client-class solid state drives, typically attached as a register level interface to the PCI Express (PCIe) interface. NVMe includes a Host Memory Buffer (HMB) feature that provides an NVMe controller with exclusive access to an assigned portion of host memory. The use of the host memory resources is vendor specific. Host software may not be able to provide any or a limited amount of the host memory resources requested by an NVMe controller.

HMB management in pre-boot is limited to enabling and disabling HMB support only. The HMB region cannot be managed based on attributes of the applicable VM, application, operating system (OS), or device. OS drivers lack the capability to efficiently allocate dedicated regions to different VMs, applications OS, or drivers from a statically allocated HMB region. OS management is very inefficient at dynamically growing or shrinking the HMB region based on usage, leaving no room for other applications. In addition, whereas newer workstations or notebooks may include an option to host multiple NVMe drives, OS HMB management is not currently capable of managing multiple HMB regions mapping across multiple NVMe drives. In addition, OS HMB management is incapable of managing multiple HMBs across VMs, applications, drivers. Lack of usage-context specific HMB management in the present architecture based on Application/VM usage or criticality or priority.

SUMMARY

Disclosed systems and methods support dynamic HMB mapping at runtime to ensure seamless access across an array of NVMe drives. Disclosed systems and methods may feature a runtime workload context-aware memory reference protocol that provides a dynamic way to adjust the size of HMB as well internal memory regions based on the workload of an application, VM, or container. In at least some embodiments, disclosed systems and method detect an NVMe drive swap or removal event and dynamically retain, merge, adjust the HMB regions.

With the emphasis on faster and efficient input/output (I/O) management, disclosed features beneficially include a dynamic context-aware HMB management protocol to ensure seamless access to HMB configuration across one or more NVMe drives at OS runtime. Disclosed HMB management protocols can dynamically adjust the HMB configuration based on the current workload context and usage to promote faster I/O operations.

Embodiments may incorporate a Virtual I/O driver to manage the swapping or addition of NVMe drives. The Virtual I/O driver may interact with a memory region table (MRT) through the Virtual NVMe I/O Table. Whenever there is a change in the NVMe PCIe bus, the driver intelligently responds by dynamically extending or shrinking the HMB region. This is achieved by adding or removing Memory Regions (MR).

The MRT may also be accessed by the context-aware Smart I/O driver. In at least some embodiments, this driver continuously monitors the HMB consumers at the software layer, including VMs, hypervisors, applications and the OS. It can request dynamic changes in the HMB region by utilizing the MRT, ensuring that the HMB allocation aligns with the changing requirements of the software components.

Disclosed features address single and multiple NVMe drives. At least some embodiments introduce a dynamic approach to handle HMB mapping during runtime, ensuring smooth access to an array of NVMe drives. This approach supports both single NVMe and multiple NVMe configurations. To facilitate this, a virtual NVMe memory space is established, enabling the mapping of the array of NVMe drives and serving as a bridge to the HMB regions. By memory mapping the DMA (Direct Memory Access) controller to this HMB region, disclosed features simplify I/O (Input/Output) handling. This HMB Management protocol, which streamlines the management of I/O operations within the HMB region.

One or more embodiments enable a capability to partition the HMB into multiple MRs based on the current execution context of the system. MRs can be specified via NVMe control registers and managed with an MRT.

For information handling systems with multiple NVMe drives, context-specific HMB configuration may encompass an NVMe device context or, more simply, a device context, which may be monitored by a Virtual NVMe I/O driver connected to the NVMe drives. In addition, context-specific HMB configuration may encompass a workload-context associated with the active process and, more specifically, a process type of the active process including, as examples, VMs, hypervisors, OS & OS-applications, containers, drivers, and firmware. In at least some embodiments, workload context may be monitored and indicated by a Smart I/O driver. As an example, if a VM running on the system requires a certain amount of HMB space, it sends a request to our runtime service driver, specifying its memory requirements. The driver then allocates a Memory region after considering the usage context, distinguishing between device context and workload context. If the size of the existing HMB is insufficient, disclosed runtime HMB configuration features may expand or shrink the HMB or a context-specific portion of the HMB via NVMe defined HMB settings such as HMB descriptor list upper and lower addresses and entry count.

In some embodiments, once the NVMe drive or drives are initialized, e.g., during a pre EFI initialization (PEI) phase of a boot sequence, relevant data may be passed to the driver execution (DXE) phase using a hand-off-block (HOB). The DXE driver may consume this data and push the protocol to runtime services to enable context-specific HMB management at runtime in order to support, as an example, NVMe drive additions and swaps. As another example, disclosed features support context-aware dynamic allocation of the HMB. During runtime, a process that needs to utilize the HMB, a Smart I/O driver equipped with context-aware functionality can access the MRT and allocate a memory region based on the specific requirements. If the resource requirements change, the Smart I/O driver can dynamically adjust the size of the allocated memory region, either shrinking or expanding it as needed.

In at least one aspect, disclosed systems and methods for implementing a runtime-dynamic and context-aware HMB include or perform operations for maintaining an MRT containing a plurality of MR entries, each of which may be associated with a corresponding execution context. Each MR entry may include HMB information defining an HMB for an NVMe drive. Upon detecting a change in the execution context, an MR entry associated with the new execution context may be determined and the corresponding HMB information may be used to configure the HMB. In at least some embodiments, the MR entries define a contiguous block of host memory that corresponds to the HMB. The HMB may be runtime configured with a dynamic HMB management protocol to map the configures HMB controller of the NVMe drive.

In at least some embodiments, the execution context may include a workload context component and a usage component. As discussed above, the workload context may correspond to a type of the current workload. A workload type may be any of various known workload types including, as non-limiting examples: a VM workload type, a container workload type, and an application program type. The usage component may be determined, at least in part, by a usage metric indicative of a usage of the HMB.

Disclosed systems and methods can accommodate additions of new NVMe drives and the removal of existing NVMe drives. These embodiments may enumerate, scan, or otherwise monitor a PCIe bus for NVMe drive changes and, responsive to detecting an NVMe drive change, adjusting a size of the HMB. In such scenarios, the HMB can be increased or decreased appropriately by adding MR entries to or deleting MR entries from the MRT.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
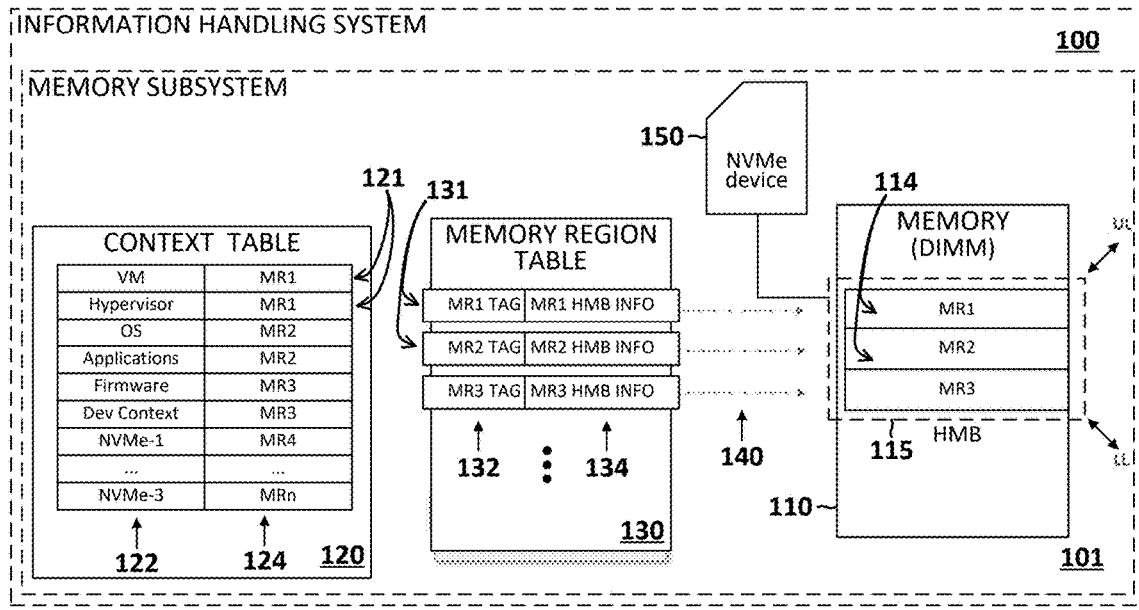
FIG. 1 illustrates information handling system features for implementing context-aware HMB configuration.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIGS. 1-5 illustrate aspects of methods and systems implementing an HMB management protocol enabling runtime and context-aware HMB configuration for one or more NVMe drives. Disclosed features may divide an HMB into multiple memory regions to accommodate various execution contexts including, as an example, a process-type context indicative of a process type of the active process, e.g., VM, container, application, driver, etc. Execution context may also encompass a usage metric indicative of a demand or loading associated with the active process and/or any corresponding resource constraints. With respect to HMB in particular, such a usage metric might indicate, as an example, an HMB availability metric indicative of a percentage of the HMB that is currently unallocated or otherwise available.

Turning now to the drawings, FIG. 1 illustrates an information handling system 100 including features for context-aware runtime configuration of NVMe HMBs. As depicted in FIG. 1, a memory/storage subsystem 101 of information handling 100 includes primary storage resources, referred to herein system simply as memory 110, and at least one second storage resource in the form of an NVMe drive 150. Some or all of the memory 110 depicted in FIG. 1 is implemented in one or more dual inline memory modules (DIMMs), but other types of memory modules an/or devices may be employed. The NVMe drive 150 illustrated in FIG. 1, which may be implemented as an NVMe compliant solid state drive (SSD), includes an NVMe controller 151 and an array 152 (FIG. 2) of persistent storage cells. For purposes of this disclosure, references to NVMe drive 150 and NVMe controller 151 are substantially interchangeable unless expressly indicated to the contrary. As depicted in FIG. 1, an HMB, 115 corresponding to a portion of memory 110, has been defined for NVMe 150. An HMB is portion of system memory defined by the host system and reserved for the exclusive use of NVMe 150.

Information handling system 100 includes components, modules, and/or other elements supporting context-aware HMB configuration. As depicted in FIG. 1, for example, information handling system 100 includes a context table 120 and an MRT 130.

The context table 120 depicted in FIG. 1 includes a plurality of context table entries 121. Each context table entry 121 includes a context identifier 122 and a memory region identifier 124. The MRT 130 illustrated in FIG. 1 includes a plurality of MRT entries 131. Each MRT entry 131 depicted in FIG. 1 includes an MR tag 132 and MR-specific HMB information 134.

In at least one embodiment, a memory region identifier 124 associates an execution context, indicated by the context identifier 122, with HMB information 134 in the MRT entry 132 for the execution context. A suitable HMB configuration protocol may index the MR tags 132 with the MR identifier 124 to locate the appropriate MRT entry 131 and the corresponding HMB information 134. In at least one embodiment, HMB information 134 includes information identified in the NVMe specification for defining a system memory region as an HMB for an NVMe drive. Such information may include buffer address (BADD) information and a buffer size (BSIZE) value. See, e.g., Section 5.27.1.10, "NVM Express Base Specification", Rev. 2.0d, (NVM Express, Inc. Jan. 11, 2024).

FIG. 1 further depicts a mapping 140 between MRT entries 131 and, more specifically, HMB information 134 and memory regions 114 within memory 110. In at least one embodiment, the mapping 140 may include operations for retrieving HMB information 134 for a particular MRT entry 131 and using the retrieved HMB information to define an NVMe compliant HMB descriptor entry for a memory region 114 in memory 110. In at least some embodiments, each memory region 114 represents a context-specific portion of an HMB 115 that encompasses all of memory regions 114.

Figure 2:
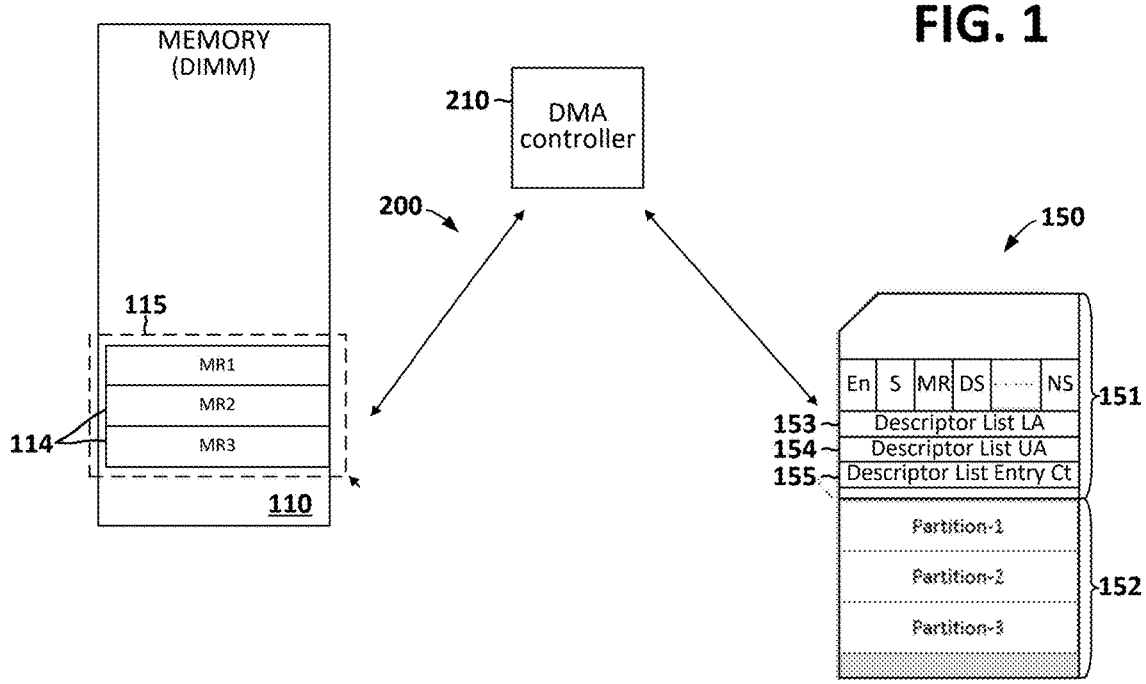
FIG. 2 illustrates exemplary runtime HMB configuration and management.

FIG. 2 illustrates an exemplary real time context-aware HMB configuration 200 employing a direct memory access (DMA) controller 210 to map any one or more of the memory regions 114 associated with HMB 115 to NVMe controller 151 of NVMe drive 150. In at least some embodiments, the memory regions 114 may be defined by one or more NVMe-compliant descriptor entries including the Host Memory Descriptor List Lower Address 153, the Host Memory Descriptor List Upper Address 154, and the Host Memory Descriptor Entry Count 155, and the HMB configuration 200 depicted in FIG. 2 may include operations, not explicitly depicted in FIG. 2, for retrieving HMB information 134 from MRT table 130 (FIG. 1), determining appropriate values for the system memory addresses based on the HMB information, the host memory descriptor parameters in NVMe controller 151. After host memory descriptor list parameters have been set in NVMe controller 151, DMA controller 210 may be used to store host memory descriptor entries, specifying a host memory address and a size value. The host memory address region defined by a descriptor entry becomes a part of the HMB.

Figure 3:
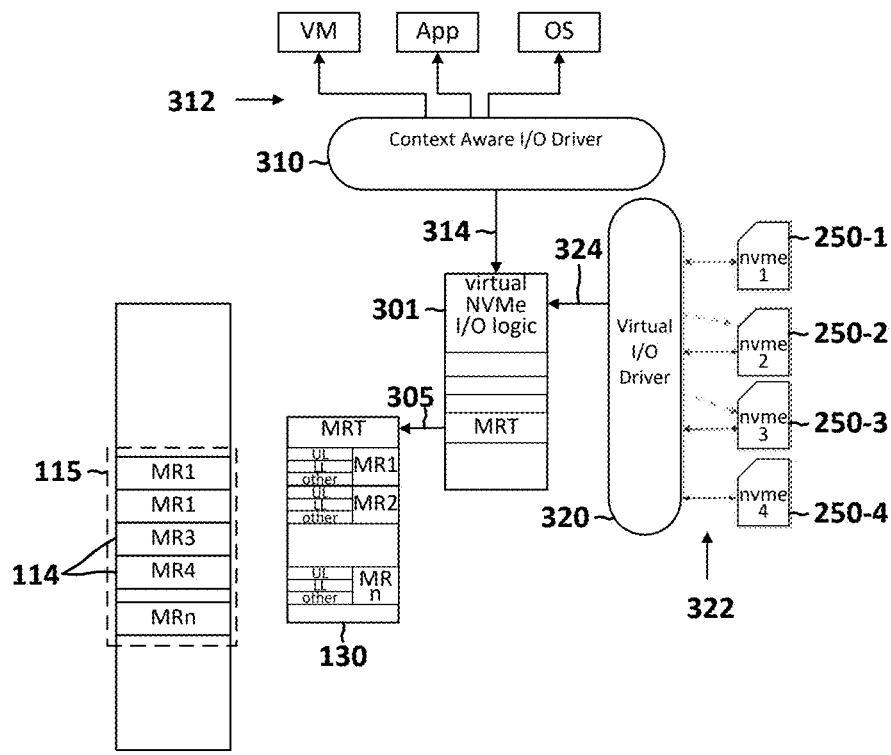
FIG. 3 illustrates workload-aware and device-aware HMB configuration features of an information handling system.

FIG. 3 illustrates elements of an exemplary systems management feature 300 enabling context-driven runtime HMB configuration in an information handling system provisioned with one or more NVMe drives 150. As depicted in FIG. 3, feature 300 employs a context-aware I/O driver 310 and a virtual I/O driver 320 to perform runtime configurations of HMB 115 based on the execution-context of the system. In at least some embodiments, the execution-context may include a workload component or workload-context associated and a device component referred to herein as a device context. As depicted in FIG. 3, context-aware I/O driver 310 receives inputs 312, indicative of workload context information such as the a process type of the active process, i.e., the process currently being executed by the information handling system. As shown in FIG. 3, context-aware I/O driver 310 may receive workload context input 312 indicating a process-type of the active process. In at least some embodiments, the process type may be any of a predetermined set of process types including, as non-limiting examples, VM process type for a virtual machine, a container process type, an application process type, and operating system OS process type, driver process type, firmware process type, etc.

The virtual I/O driver 320 depicted in FIG. 3 may monitor device context information. Virtual I/O driver 320 may monitor one or more PCIe busses for indications of any changes to an NVMe configuration including information pertaining to additions of new NVMe drives and removal of existing NVMe drives. The device context input 322 to virtual I/O driver 320 may identify a specific NVM device 150, of which FIG. 3 illustrates four such NVMe drives (150-1, 150-2, 150-3, and 150-4).

As depicted in FIG. 3, context-aware I/O driver 310 produces an output 314 indicative of the current execution context and, more specifically, a process type of the currently executing process. Similarly, virtual I/O driver 320 produces an output 324 indicative of additions, deletions, or other changes to an NVMe configuration of one or more PCIe busses (not depicted explicitly in FIG. 3) to which NVMe drives 150 are connected. Virtual NVMe I/O logic 301 may be configured to select from a group of available execution contexts based on input signals 312 and 322 to identify a current execution context. Virtual NVMe NMe I/O logic 301 may have access to context table 120 (FIG. 1) and may use the current execution context value to index the context table 120 and retrieve the corresponding MR value 124 (FIG. 1).

The virtual NVMe I/O logic 301 illustrated FIG. 3 includes a pointer 305 to MRT 130, which virtual NVMe I/O logic 301 may use to identify an entry 131 in MRT 130. Once an MRT entry 131 is identified, the configuration of an appropriate HMB may proceed as discussed above with respect to FIG. 1 and FIG. 2.

If an NVM device 150 is added to or removed from information handling system 100, virtual NVMe I/O logic 301 may trigger creation of a new memory region 114 within memory 110, resulting in an corresponding expansion of HMB 115. Conversely, if an existing NVMe drive 150 is removed, virtual NVMe I/O logic 301 may remove an existing MR 114 and reduce the size of HMB 115 accordingly.

Figure 4:
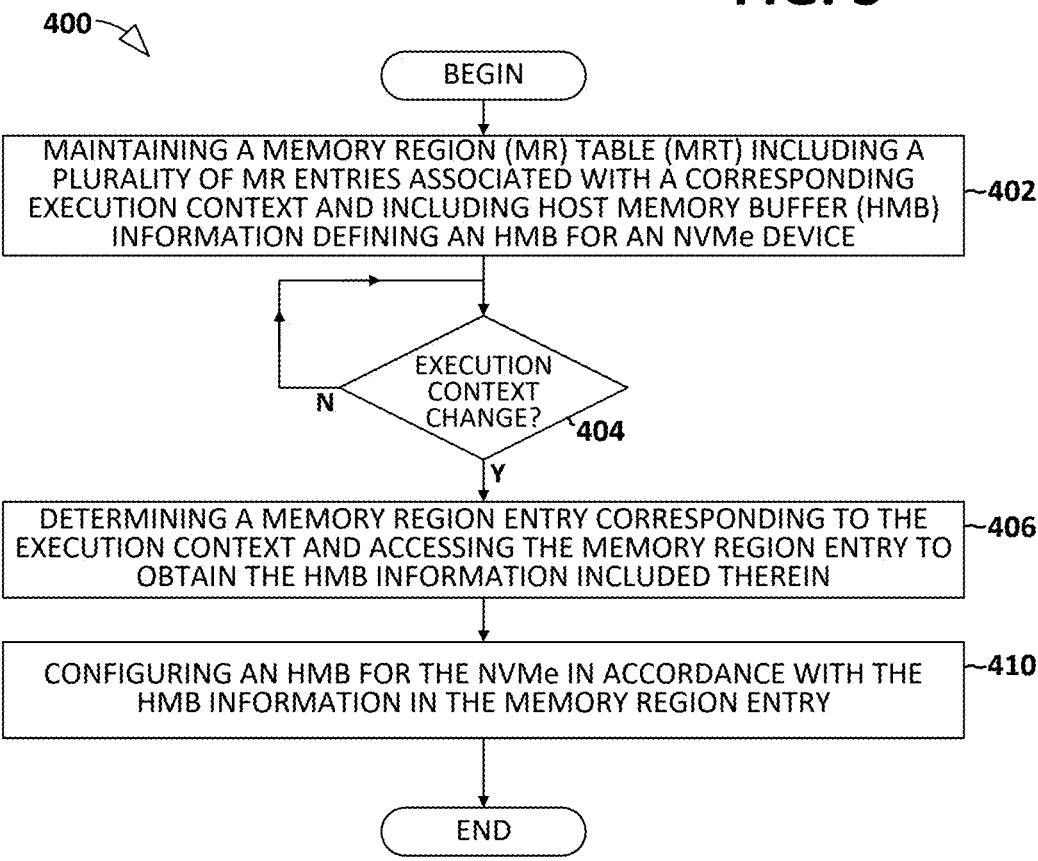
FIG. 4 illustrates a flow diagram of an HMB configuration method.

Referring now to FIG. 4, a context-aware runtime method 400 for configuring and otherwise managing an HMB state of an information handling system provisioned with one or more NVMe drives is presented. The illustrated method 400 begins with maintaining (step 402) an MRT including a plurality of MR entries, wherein, as discussed above with respect to FIG. 1, each MR entry is associated with a corresponding execution context and includes host memory buffer (HMB) information defining an HMB for an NVMe drive. Upon detecting (step 404) a change in a current execution context of the information handling system, the method 400 of FIG. 4 determines (step 406) an MRT entry 131 associated with the current execution context and configures (step 410) an HMB feature in an NVMe drive in accordance with the HMB information in the applicable MRT entry 131.

Figure 5:
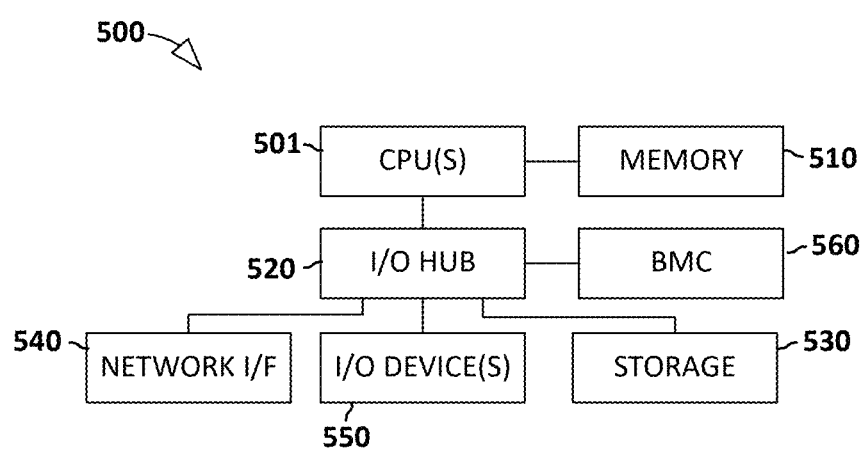
FIG. 5 illustrates an information handling system suitable for use in conjunction with systems and methods disclosed in FIGS. 1-4.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

The invention claimed is:
1. A method comprising:
   maintaining a memory region (MR) table (MRT) including a plurality of MR entries, wherein each MR entry is associated with a corresponding execution context and includes host memory buffer (HMB) information defining an HMB for a nonvolatile memory express (NVMe) device;

responsive to detecting a change in a current execution context of an information handling system, determining an MR entry associated with the current execution context; and configuring the HMB in accordance with the HMB information in the MR entry.

2. The method of claim 1, wherein the execution context is determined, at least in part, by a workload context, wherein the workload context is indicated by a workload type of a current workload, wherein the workload type is selected from the group comprising: a VM type, a container type, and an application program type.

3. The method of claim 1, wherein the execution context is determined, at least in part, by a usage metric indicative of a usage of the HMB.

4. The method of claim 1, wherein configuring the HMB includes runtime mapping of the HMB to a controller of the NVMe drive.

5. The method of claim 1, wherein the plurality of MR entries define a contiguous block of host memory and wherein the HMB corresponds to the contiguous block of system memory.

6. The method of claim 1, further comprising adding one or more MR entries responsive to detecting a new NVMe drive.

7. The method of claim 1, further comprising removing one or more MR entries responsive to detecting a new NVMe drive.

8. The method of claim 1, further comprising:

monitoring a PCIe bus for NVMe drive changes and, responsive to detecting an NVMe drive change, adjusting a size of the HMB.

9. The method of claim 8, wherein, responsive to detecting removal of an NVMe drive, decreasing a size of the HMB by removing from the MRT at least one MR entry corresponding to the NVMe drive removed.

10. The method of claim 8, wherein, responsive to detecting addition of an NVMe drive, increasing a size of the HMB by adding to the MRT at least one MR entry corresponding to the NVMe drive added.

11. An information handling system, comprising:

a central processing unit (CPU);

a memory, including processor executable instructions that, when executed by the CPU, cause the system to perform operations including:

maintaining a memory region (MR) table (MRT) including a plurality of MR entries, wherein each MR entry is associated with a corresponding execution context and includes host memory buffer (HMB) information defining an HMB for a nonvolatile memory express (NVMe) device;

responsive to detecting a change in a current execution context of an information handling system, determining an MR entry associated with the current execution context; and configuring the HMB in accordance with HMB information in the MR entry.

12. The information handling system of claim 11, wherein the execution context is determined, at least in part, by a workload context, wherein the workload context is indicated by a workload type of a current workload, wherein the workload type is selected from the group comprising: a VM type, a container type, and an application program type.

13. The information handling system of claim 11, wherein the execution context is determined, at least in part, by a usage metric indicative of a usage of the HMB.

14. The information handling system of claim 11, wherein configuring the HMB includes runtime mapping of the HMB to a controller of the NVMe drive.

15. The information handling system of claim 11, wherein the plurality of MR entries define a contiguous block of host memory and wherein the HMB corresponds to the contiguous block of system memory.

16. The information handling system of claim 11, wherein the operations include:

adding one or more MR entries responsive to detecting a new NVMe drive.

17. The information handling system of claim 11, wherein the operations include:

removing one or more MR entries responsive to detecting a new NVMe drive.

18. The information handling system of claim 11, wherein the operations include:

monitoring a PCIe bus for NVMe drive changes and, responsive to detecting an NVMe drive change, adjusting a size of the HMB.

19. The information handling system of claim 18, wherein, responsive to detecting removal of an NVMe drive, decreasing a size of the HMB by removing from the MRT at least one MR entry corresponding to the NVMe drive removed.

20. The information handling system of claim 18, wherein, responsive to detecting addition of an NVMe drive, increasing a size of the HMB by adding to the MRT at least one MR entry corresponding to the NVMe drive added.

* * * * *